United States Patent [19]
Ishii et al.

[11] Patent Number: 6,051,950
[45] Date of Patent: Apr. 18, 2000

[54] POSITIONAL DETERMINATION DEVICE USING A STEPPING MOTOR

[75] Inventors: Shigeru Ishii, Atsugi; Tateki Jozaki, Zama, both of Japan

[73] Assignee: Nissan Motor Co., Ltd., Yokohama, Japan

[21] Appl. No.: 09/143,371

[22] Filed: Aug. 28, 1998

[30] Foreign Application Priority Data

Aug. 29, 1997 [JP] Japan .................................. 9-234179

[51] Int. Cl.$^7$ .................. H02P 8/08; F16H 9/18
[52] U.S. Cl. .................. 318/696; 318/685; 318/11; 477/46
[58] Field of Search .................. 318/685, 696, 318/9, 11; 477/34, 37, 44, 45, 46, 48, 49, 50

[56] References Cited

U.S. PATENT DOCUMENTS

| | | | |
|---|---|---|---|
| 4,871,954 | 10/1989 | Rathgeber | 318/466 |
| 4,908,017 | 3/1990 | Howson et al. | 604/67 |
| 5,538,483 | 7/1996 | Kobayashi et al. | 476/10 |
| 5,624,349 | 4/1997 | Yamamoto | 477/46 |

FOREIGN PATENT DOCUMENTS

| | | |
|---|---|---|
| 7-310811 | 11/1995 | Japan . |
| 8-178063 | 7/1996 | Japan . |
| 9-317570 | 12/1997 | Japan . |

*Primary Examiner*—Bentsu Ro
*Attorney, Agent, or Firm*—Foley & Lardner

[57] ABSTRACT

A positional determination device which is drived according to the pulse signals output to a stepping motor 1 and displaces a nut 2 to a position corresponding to the degree of rotation. In order to adjust the initializing position of a feed mechanism, the stepping motor 1 is rotated and the nut 2 displaces until it reaches the limiting position (LimA) defined by the stopper 3a. When initializing, the pattern of temporarily stopping the stepping motor 1 for a period corresponding to a pulse number (N2) at each pulse number (N1) and rotating is repeated. As a result the rotations of the stepping motor 1 become gentle and even if the nut 2 were to collide with the stopper 3a at the limiting position, the reverse rotation of the stepping motor 1 can be prevented and accurate adjustment of the initializing device can be performed.

6 Claims, 7 Drawing Sheets

POSITIONAL DETERMINATION DEVICE USING A STEPPING MOTOR

FIELD OF THE INVENTION

The present invention relates to a positional determination device having a feed mechanism which uses a stepping motor as its source of motive force and more particularly the invention relates to the adjustment of the initialization of the stepping motor.

BACKGROUND OF THE INVENTION

Positional determination devices which use stepping motors as a source of motive force are disclosed in JP-Tokkai Hei 7-310811, Tokkai Hei 8-178063 and Tokkai Hei 9-317570.

This device is provided with a feed mechanism which is driven by a stepping motor. An engaging nut with a screw shaft compose the feed mechanism, the nut displaces in response to the rotation of the screw shaft. The nut is connected with a control means and its position is controlled by the rotation of the stepping motor. Pulse signals are utilized for controlling rotation of the stepping motor. The number of pulses determines the amount of rotation, that is to say, the displacement.

The displacement of the feed mechanism diverges from its target position if the stepping motor does not correctly rotate corresponding to the number of input pulses. Although this kind of divergence, in other words, irregularity in the stepping motor, does not happen very often, it does happen on occasion. It is necessary to initialize the stepping motor feed mechanism to correct such a divergence.

For example, in Tokkai Hei 8-178063, stoppers are respectively provided on the limiting positions of the displacement range of the nut. When initializing, the stepping motor is rotated, the nut is displaced until it hits either of the stoppers and its terminal position is set as the initializing position.

When initializing, if there is a divergence in the nut position, the nut will collide with the stopper before reaching the number of rotations which the stepping motor has previously calculated. In this case, the force of the collision due to the speed of the stepping motor's rotation causes the stepping motor to rebound or reverse. The stepping motor reverses in the same sequential rotation in the opposite direction by the number of input pulses left over. This phenomenon is particularly likely to occur in stepping motors with a small number of magnetic poles. As a result, the position of the nut when the stepping motor has stopped rotating does not correspond with the position of the stopper. Therefore in this situation the problem has arisen that initializing has not been correctly performed.

SUMMARY OF THE INVENTION

It is an object of the present invention to provide initialization of a stepping motor correctly under normal conditions.

It is a further object of the present invention to carry out correct initialization without using a special sensor or switch.

In order to achieve the above objectives, the positional determination device of the present invention is provided with a stepping motor which rotates on the basis of pulse signals in fixed time intervals, a controller which outputs the pulse signals to the stepping motor and controls the rotations and a movable member which moves toward a target position through a feed mechanism on the basis of the amount of rotations of the stepping motor. Furthermore the invention is provided with stoppers placed respectively on the limiting positions of the movable range of the movable member and an initializing mechanism which rotates the stepping motor until the movable member reaches the stopper and adjusts the initializing position of the feed mechanism. The initializing mechanism repeats the pattern of rotating the stepping motor by only a fixed number of pulses, stopping the rotations for a period corresponding to that fixed number of pulses until the movable member reaches the stopper.

Furthermore the initializing mechanism rotates the stepping motor continuously without any temporary terminations until just before the displacement member reaches the stopper. Furthermore the initializing device lengthens the intervals between the pulse signals on commencement of rotating the stepping motor.

The details as well as other features and advantages of this invention are set forth in the remainder of the specification and are shown in the accompanying drawings.

DETAILED DESCRIPTION OF THE PREFERRED EMBODIMENTS

Figure 1:
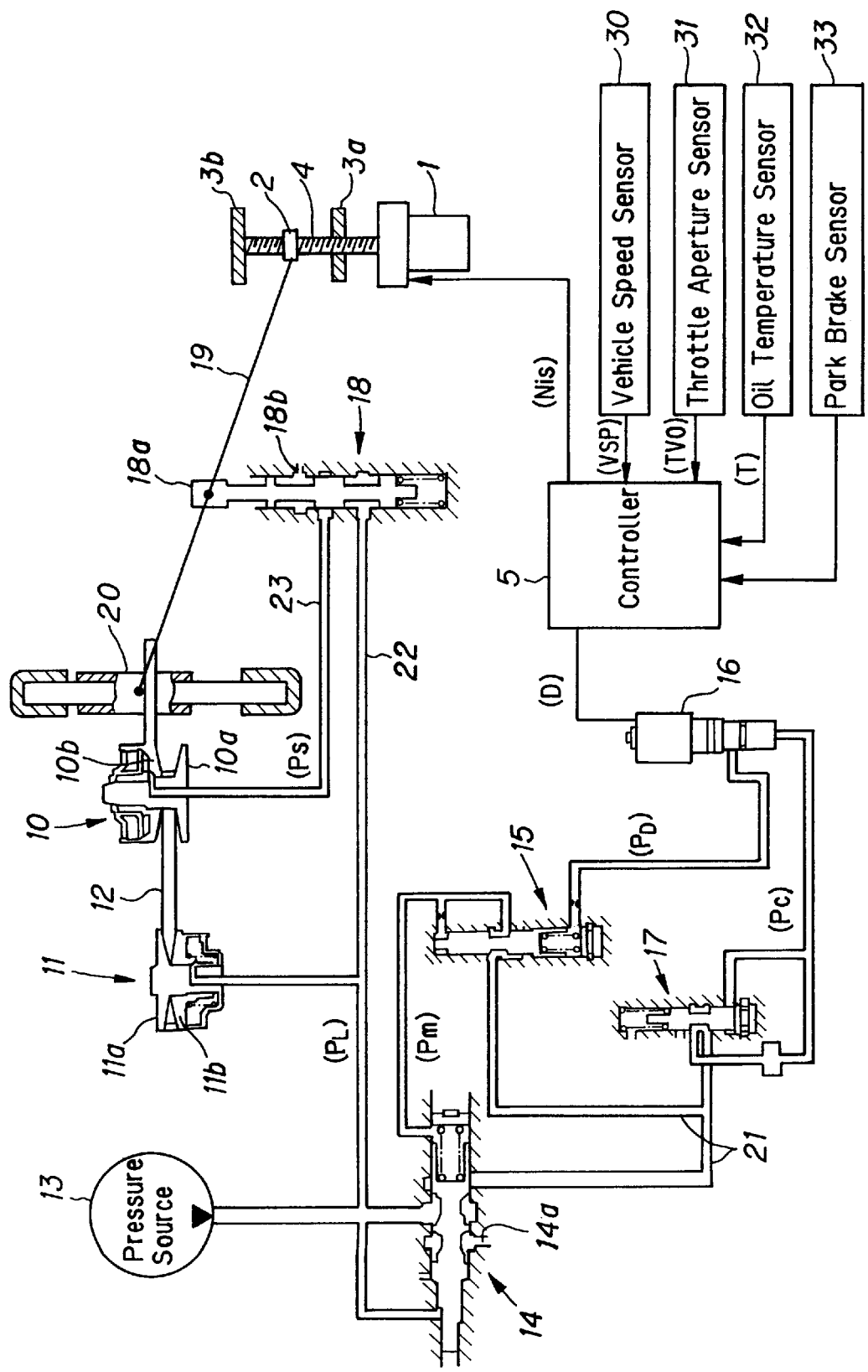
FIG. 1 is a system view which shows the variable control device of a V-belt type continuously variable transmission which is provided with the initialization device in accordance with this invention.

FIG. 1 shows an example of a variable control device for use with a V-belt type continuously variable transmission.

A V-belt type continuously variable transmission is provided with a primary pulley 10 which acts as an input pulley for inputting the engine rotations and a secondary pulley 11 which outputs the rotations after a change in speed. The V-belt 12 is wound between the primary and secondary pulleys 10, 11.

The V-belt continuously variable transmission is constituted by the variable groove width of the pulleys 10, 11. Changes in the groove width changes the radius of the wound pulleys 10, 11, that is, they change the pulley ratio. This allows the continuous variation of the transmission ratio of the rotational speed.

As a result the primary pulley 10 is provided with a movable flange 10b which is movable in the axial direction with respect to a fixed flange 10a. The V groove width changes depending on the degree of displacement. The movable flange 10b is provided with a piston to allow its displacement. The piston moves in response to variable control pressure $P_s$ and as a result varies the V groove width.

In the same way, the secondary pulley 11 comprises a movable flange 11b which is movable in the axial direction and forms the movable pulley V groove with respect to the fixed flange 11a. Line pressure $P_L$ is applied to the piston of the movable flange 11b.

However since area of the piston on which the control pressure acts on the primary pulley side 10 is large, when the groove width on the primary side changes, the groove width of the pulley 11 on the secondary side which is linked through the V-belt 12 changes. Therefore the pulley ratio changes depending on the variable control pressure $P_S$ and the variable speed ratio is continuously controlled.

The control line for line pressure comprises a pressure source such as a pump and a pressure regulator valve 14 which adjusts the working oil to a line pressure $P_L$. It further comprises a pressure modifier valve 15 for supplying modifier pressure $P_M$ used for controlling line pressure to the pressure regulator valve 14, a line pressure solenoid valve 16 for supplying the control pressure of the pressure modifier valve 15 and pilot valve 17 for applying a constant pressure $P_C$ to the solenoid valve 16.

The pressure regulator valve 14 displaces with respect to modifier pressure $P_M$. In this way it drains a portion of the working oil from the pressure source 13 to the drain port 14 and maintains the pressure of the line 22 to the line pressure $P_L$ according to the modifier pressure $P_M$. The pressure regulator valve 14 lets (leaks) a portion of the working oil into the line 21.

The pilot valve 17 adjusts oil from the line 21 to the constant pressure $P_C$ and supplies it to the line pressure solenoid valve 16. On the basis of the constant pressure $P_C$, the line pressure solenoid valve 16 adjusts to a duty pressure $P_D$ according to a motive duty D. This pressure is sent to the modifier valve 15 which increases it to the modifier pressure $P_M$. This is supplied to the pressure regulator valve 14 and the line pressure $P_L$ above is regulated thereby. Therefore the line pressure $P_L$ depends on the solenoid motive duty D controlled by the controller 5.

The variable control system comprises a variable control valve 18 for determining the variable control pressure $P_S$, the variable link 19, and the feed mechanism for linking with the stepping motor.

One end of the variable link 19 is connected to the shifter 20 which displaces together with the movable flange 10b of the primary pulley 10. The other end is connected to the nut 2 which is joined to the lead screw 4 of the stepping motor 1. Furthermore a position along the variable link 19 is connected to the spool 18a of the variable control valve 18.

The variable control valve 18 reduces the line pressure $P_L$ from the line 22 and regulates the variable control pressure $P_S$ lead into the line 23. When the spool 18a displaces to the upper part of the diagram and the variable control pressure $P_S$ rises and the spool 18a displaces downwardly, the variable control pressure $P_S$ is reduced through the variable line 23 into the drain port 18b.

The displacement of the spool 18a is controlled by the stepping motor through the variable link 19. The rotational position of the stepping motor 1 is determined by the controller 5 and by this, variable control is carried out as shown below.

The controller drives the solenoid valve 16 as discussed above and controls the line pressure. It also drives the stepping motor 1 and carries out variable control. Further it initializes the transmission device via the stepping motor 1.

In order to carry out such control, the signal from the vehicle speed sensor 30 which detects vehicle speed (VSP), the signal from the throttle aperture sensor 31 which detects the engine throttle aperture (TVO), and the signal from the oil temperature sensor 32 which detects the temperature T of the working oil in the transmission are input into the controller.

Figure 2:
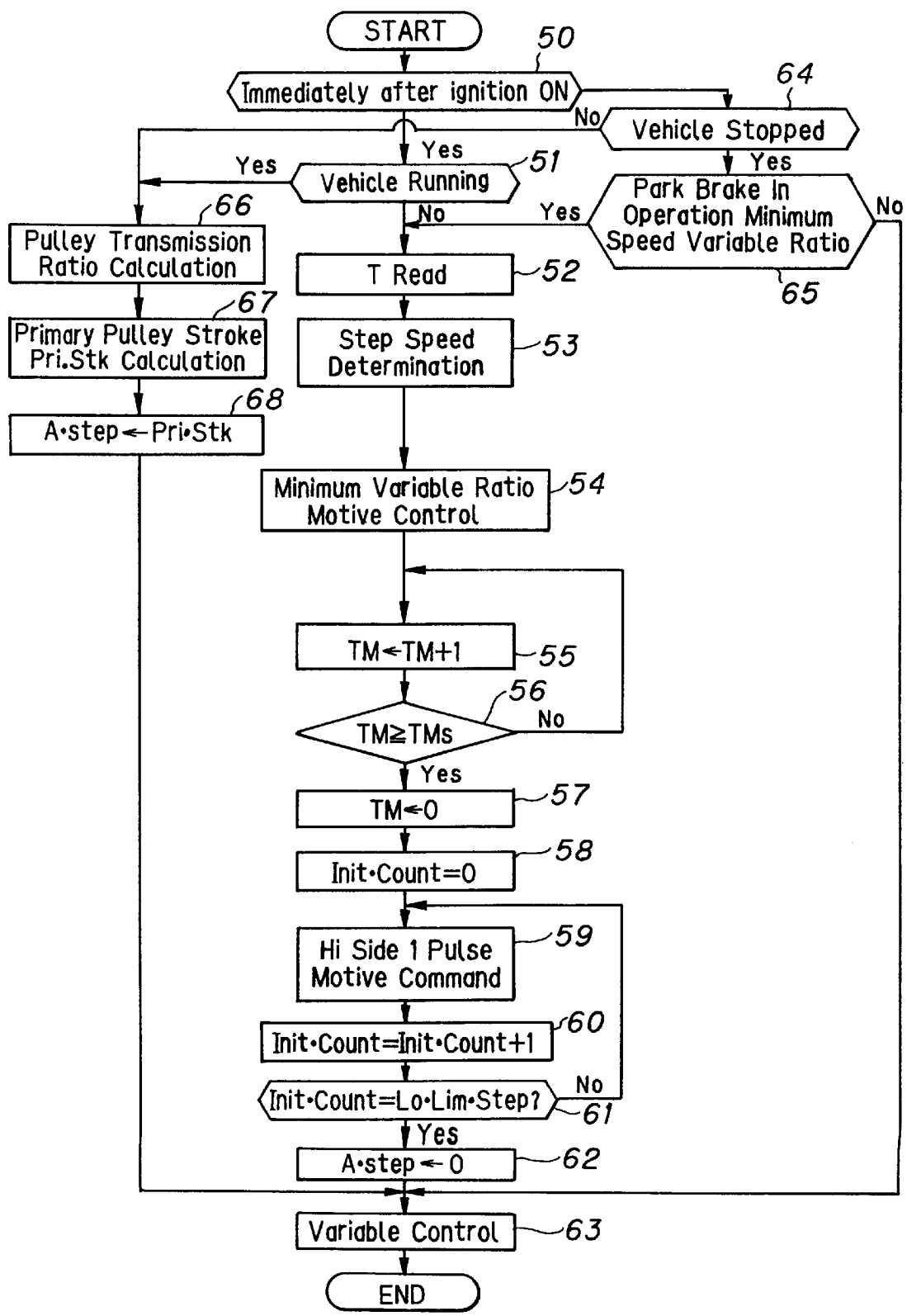
FIG. 2 is a flow chart which shows a program of the initialization and variable control carried out by the controller.
Figure 3:
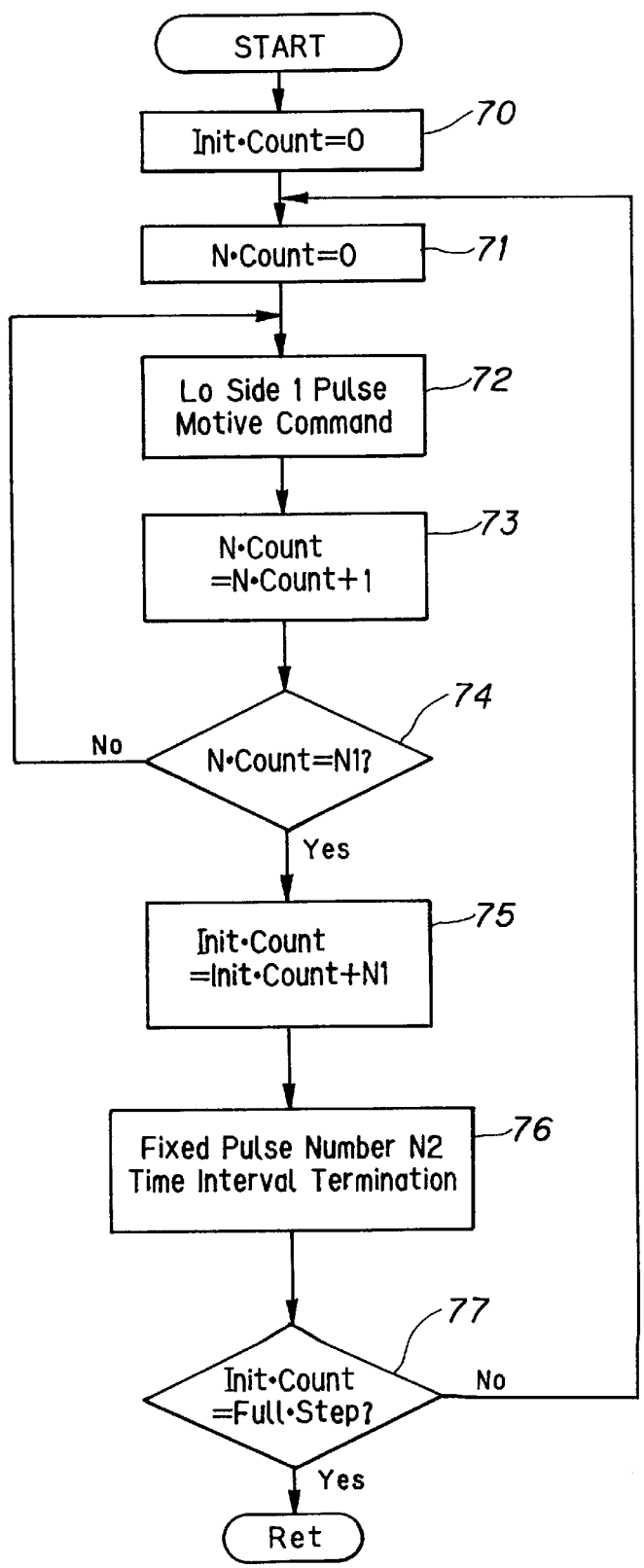
FIG. 3 is a flow chart which shows the program of initialization executed by the controller.

The controller 5 performs initialization and variable control according to the control programs set out in FIGS. 2 and 3.

First the invention will be explained on the basis of FIG. 2.

In a step 50, it is determined whether or not the power source of the controller 5 has just been turned on or not, that is to say, whether the engine has just been activated or not. If it is immediately after activation, in a step 51 which corresponds to a stationary vehicle detecting means, it is determined whether the vehicle is running or is stationary on the basis of the vehicle speed (VSP).

If the vehicle is stationary, initialization of the stepping motor is performed as detailed below.

Furthermore, even if, in the step 50, it is determined that the power source has not just been switched on, if it is determined in a step 64 that the vehicle is stationary from the vehicle speed (VSP) or subsequently in a step 65, if it is determined that the brake switch is ON and that the lowest speed ratio has been selected, initialization is performed.

In a step 52, the oil temperature of the working oil in the transmission is read and in a step 53, the motive speed (Step Speed) of the stepping motor 1 is determined on the basis of the oil temperature (T). The motive speed (Step Speed) of the stepping motor 1 decreases as the oil temperature decreases and the motive torque increases. The viscosity resistance of the variable control valve 18 increases as the oil temperature (T) decreases and the required motive force of the stepping motor 1 increases as a result.

In a step 54, the nut 2 is moved to the limiting position (LimA) on the minimum variable ratio side which is limited by a stopper 3a. Refer to FIG. 3 for a concrete example of the control.

Figure 4:
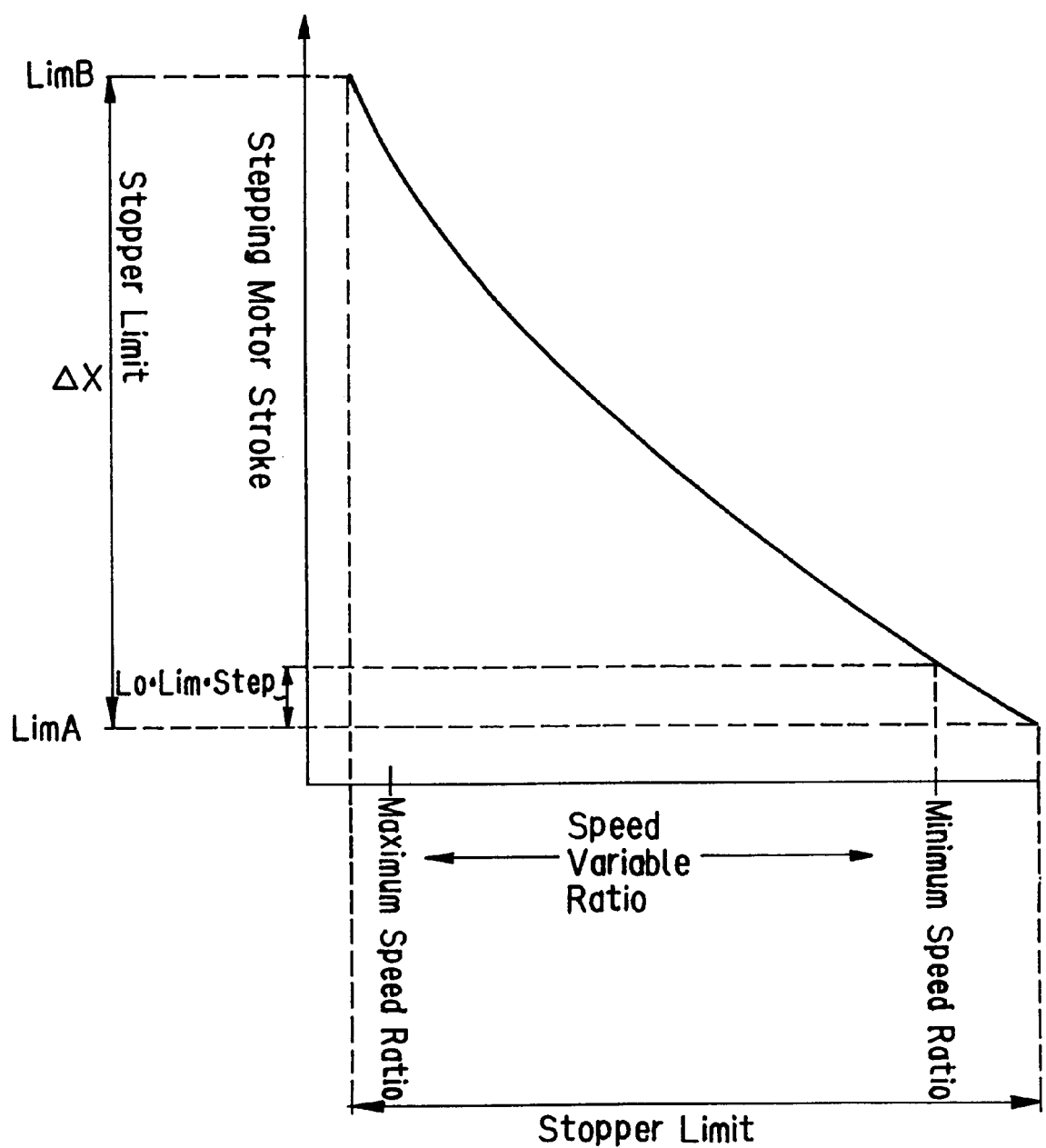
FIG. 4 shows the relation between a speed ratio and a stepping motor stroke.

While the stepping motor 1 is rotated intermittently, control continues until it is determined that the initializing counter (Init Count) has reached a count value constituting a (Full Step) with respect to the limiting position (LimA) on the side nearest the minimum speed variable ratio on the hardware limit shown in FIG. 4. The stepping motor 1 then moves the nut 2 to the limiting position (LimA) defined by the stopper on the side closest to the minimum speed variable ratio.

In the steps 70 and 71, the initializing counter (Init Count) and the motive pulse counter (N Count) are reset to 0. Then in a step 72, single pulses are output to drive the stepping motor 1 towards the minimum variable ratio side (Lo). In a step 73, each time a pulse signal is output, the pulse counter (N Count) counts the pulse.

In a step 74, the output of signal pulses is repeated until the pulse counter (N Count) reaches the count value (N1) which shows that a predetermined number of pulses has been equaled. When the fact that the count has reached a count value of (N1) in a step 74 is detected, in a step 75, the initializing counter (Init Count) is incremented by the count value (N1) and the process continues to a step 76.

In the step 76, the output of pulse signals to the stepping motor 1 is stopped at time intervals corresponding to the determined pulse number (N2).

After that time, in a step 77, it is determined whether or not the initializing counter (Init Count) has reached a count value (Full Step) which shows the predetermined pulse number (Nall). If it is determined in the step 77 that the initializing counter (Init Count) has not reached the count value (Full Step) the process is returned to the step 71 and the process is repeated.

In other words, the pattern of rotating the stepping motor 1 by a fixed number of pulses (N1) and stopping it intermittently for a period corresponding to a fixed number of pulses (N2) is repeated(refer to FIG. 6) and the process of control in steps 71–77 continues until the initializing counter (Init Count) reaches a set count value of (Full Step).

The count value (Full Step) has a fixed value at this point. Even if it is assumed that in the step 70, the stroke of the stepping motor 1 (the position of the nut of the feed mechanism) is at the limit (LimB) on the side closest to the maximum speed variable ratio, the initializing counter (Init Count) is set so that the limiting position (LimA) on the side closest to the minimum speed variable ratio will definitely be reached by the time the count value is a (Full Step).

When the limiting position of the stepping motor is reached, the process returns to the control program in FIG. 2.

After the timer (TM) is incremented in a step 55, in a step 56, after a fixed waiting time (TMs) has elapsed and the stepping motor is moved to the limiting position on the side of the minimum variable ratio, the process continues to a step 58 when the waiting time (TMs) has elapsed.

In the steps 58–61, the stepping motor 23 returns from a limiting position on the initializing driving position, that is to say, on the minimum variable ratio side to a position from which it can begin normal variable control slightly on the high variable ratio side.

In a step 58, the initializing counter (Init Count) is reset to 0. In the steps 59, 60 the stepping motor 1 is returned to the high speed variable ratio side one step at a time at the above speed (Step Speed). As shown in FIG. 4, the stepping motor continues to rotate until the initializing counter (Init Count) reaches the count value (Lo Lim Step) which corresponds with the minimum speed variable ratio existing in the limiting range □X due to the stopper. If it is determined in the step 61 that the count value (Lo Lim Step) has been reached, the process continues to the step 62 where the initializing position of the stepping motor is set with the command value (A step) of the stepping motor 1 at 0.

In this way the initializing of the stepping motor is carried out and the initializing position of the transmission device is set to a position in which the actual control corresponds to the minimum possible variable ratio, that is it is correctly set to 0.

If it is determined in the steps 51,64 that the vehicle is running, the motor driving command value (A step) is set as discussed below. In a step 66 which corresponds to an actual variable ratio calculation means, the pulley transmission ratio (variable ratio) is calculated. In the step 67 which corresponds to a motor rotation position estimation means, the stroke of the movable flange 10b of the primary pulley (Pri Stk) is estimated. In a step 68 which corresponds to a running motor command value initializing means, the motor driving command value (A step) is set to this stroke (Pri Stk,).

Once initializing is completed, in the next step 63, normal variable control is performed.

Figure 5:
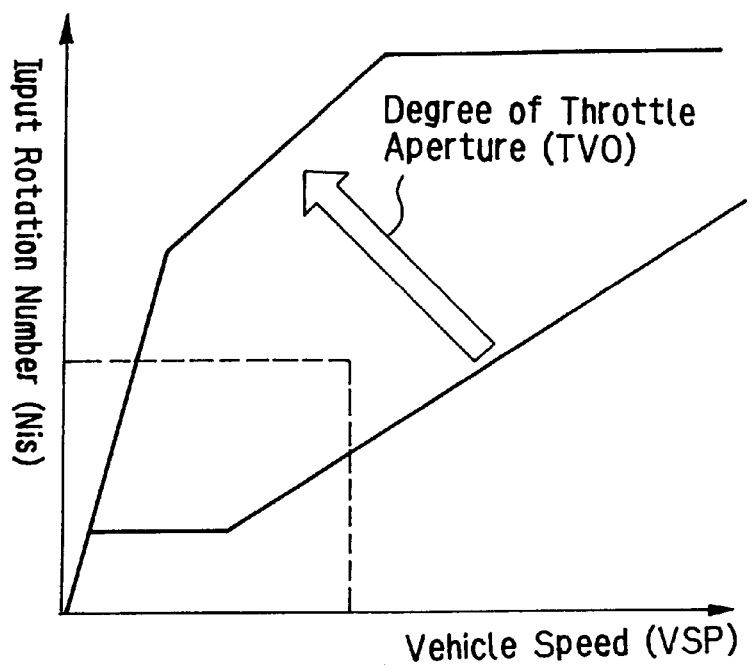
FIG. 5 is a diagram of the pattern of variable control used when changing speed.

In this variable control domain, the controller 5 searches for the input rotation number (Nis) which should be used as a standard from the vehicle speed (VSP) and the degree of throttle aperture (TVO) on the basis of the map which corresponds to the variable control characteristics as shown in FIG. 5 and indicates the corresponding standard rotation position of the stepping motor 1 to the motor as a stepping motor command value (A step).

Thus the stepping motor 1 is driven to the standard rotation position at the speed (Step Speed) and as a result the stepping motor 1 directly impels the variable link 19 along the shifter 20 and the variable control valve spool 18a is moved through a stroke to a corresponding position.

In this way the variable speed ratio is controlled so that the variable control valve 18 changes the variable control pressure ($P_S$) and hence the movable flanges 10b, 11b of both the pulleys 10, 11 vary and the standard input rotation number (Nis) is reached.

Furthermore the movement of the movable flange 10b of the primary pulley 10 is fed back to the variable control valve spool 18a through the shifter 20 and the variable link 19. As a result when a variable ratio is reached which corresponds with the standard input rotation number Nis, the variable control pressure is maintained at that pressure and it is possible to maintain the variable ratio.

Next the initializing process of the stepping motor will be explained with reference to FIGS. 6A and 6B.

Figure 6A:
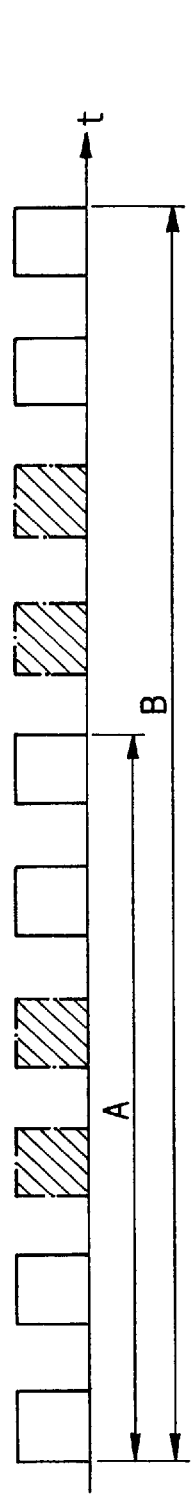
FIGS. 6(A) and (B) are time charts which show pulse signals output from the controller when initializing.

FIG. 6(A) is a time chart showing the pulse signal which should be processed by the controller 5. The figure shows step-type pulses and those parts shown by a solid line are real pulses which are actually processed by the controller 5 in the present invention. Those parts shown by a broken line are parts to which imaginary pulses are outputted that is to say parts to which pulses are not outputted or parts to which pulses are output but which the controller 5 does not process. Further, each pulse signal is outputted in equal time intervals.

When initializing, if it is assumed that the pulse number (set number Nall) which is processed by the controller 5 is six, then, in the prior art, six pulses, which contain the pulses in the solid and broken lines, are outputted continuously in equal time intervals from the left side of the figure with all pulses being real (domain A).

In contrast, in the present invention, while the pattern is repeated of temporarily stopping at each real pulse number N1 (=2) shown by a solid line for a period corresponding to an imaginary pulse number N2 (=6) shown by a broken line and outputting a pulse signal of a set number Nall (=6) (Domain B). In other words, after rotating the motor 1 by two real pulses, the pattern of the six pulses namely of stopping the pulse output for a period of two imaginary pulses or stopping calculation processing and temporarily stopping the stepping motor is repeated. Furthermore the values of the pulses N1, N2 are not limited to the above values but could be for example N1=4, N2=4. Furthermore the relation between the number of pulses N1, N2 does not necessarily have to take the same mutual values: N1>N2 or N1<N2.

As is clear from FIG. 6(A), after initialization, the controller 5 while repeating the pattern of temporarily stopping the rotation of the stepping motor for a period corresponding to a fixed number of pulses N2 at each fixed pulse number N1, outputs pulses signals of predetermined numbers Nall. In this way when initializing, even if the nut 2 rebounds after touching the stopper 3a while the stepping motor 1 is rotating since the stepping motor 1 is not continuously rotating, the rebound is weak and the inverse rotation of the stepping motor 1 can be accurately stopped.

Therefore even if pulse signals are input after a collision with the stopper, the nut 2 can be stopped in that position.

Figure 6B:
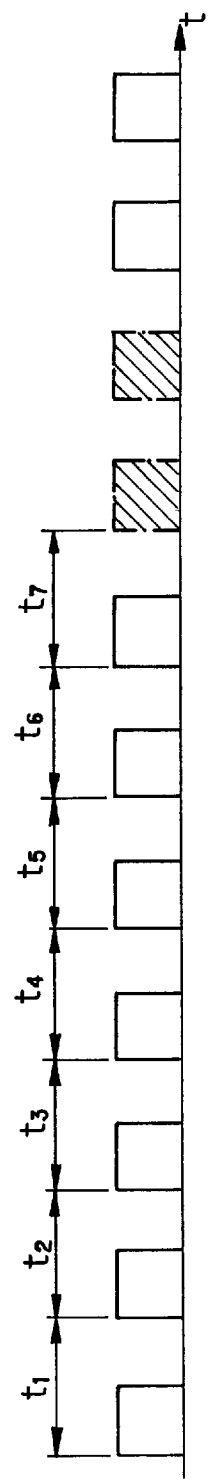
Figure 7:
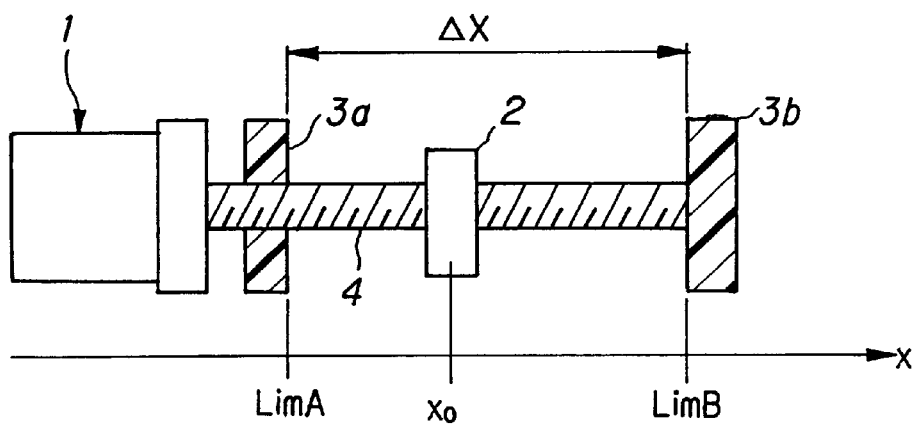
FIG. 7 is an enlarged view of a positional determination device which uses a stepping motor.

FIG. 6(B) shows the example of the fixed number Nall of pulse signals being processed while the pattern of temporarily stopping the rotations of the stepping motor 1 for a period of a fixed number of pulses N2 (=2) at each fixed number of pulses N1 (=7) is repeated.

Two types of control will be explained here.

In aspect 1, when the stepping motor 1 begins to rotate, for example, the control is such that the initial pulse time interval (t1, t2) is longer than the time intervals of other pulses (t3~t7). Thus since the stepping motor 1 begins to rotate at a low speed, even if the nut 2 touches the stopper 3a immediately after the stepping motor 1 begins to rotate, the rebound is small. Therefore when the stepping motor 1 begins to rotate, if the time intervals between the pulse signals are lengthened, the degree to which divergence is prevented is conspicuous.

In aspect 2, when the stepping motor 1 is stopped, it means that control is such that pulse times (t6, t7) are lengthened relative to other pulse times (t1~t5). In this case, since the stepping motor 1 is stopped at a low speed, even if the nut 2 touches the stopper 3a immediately after the stepping motor 1 has begun to stop, the rebound will be small. Therefore even if the pulse time intervals are lengthened when the stepping motor 1 begins to stop, the degree to which divergence can be prevented is conspicuous.

Furthermore by rotating the stepping motor 1 slowly at the commencement and termination of rotation, it is possible to greatly increase the motive torque and accurately commence rotating and apply braking.

Aspect 2 as discussed above, may be applied singly but has a preferred application in combination with aspect 1.

In the respective aspect, at the same time that initialization is commenced, the pattern of stopping the stepping motor 1 temporarily for a period corresponding to a fixed number of pulses N2 at each fixed pulse number N1 is repeated and the set number Nall of pulse signals is processed. However in another aspect, the stepping motor 1 may be continuously rotated during initialization without temporarily stopping it until just before the nut 2 reaches the stopper limiting position (LimA). In this case, the present position is estimated from the data used in the previous positional determination and the stepping motor 1 may be continuously rotated without temporarily stopping it until just before the nut 2 reaches the stopper limiting position (LimA) and then intermittent rotational control is performed as above until just before the limiting position (LimA) is reached. In such a way it is possible to quickly perform initialization.

The above examples are merely preferred embodiments of the present invention. It is possible to add various changes within the scope of the inventive idea according to the person skilled in the art. For example the initialization device according to the present invention need not necessarily be used in variable speed control device of a V-belt type continuously variable transmission but may also be used in precision manufacturing devices, precision measuring devices and information apparatus.

What is claimed:

1. A positional determining device in a continuously variable transmission in a vehicle, the positional determining device having a stepping motor which rotates based on a pulse signal of a predetermined time interval, a controller which outputs pulse signals to said stepping motor and controls the rotations and a movable member in the continuously variable transmission which displaces to a target position due to a feed mechanism according to the degree of rotation of said stepping motor, comprising:

stoppers placed respectively at limiting positions of a movable range of said movable member; and an initialization mechanism that initializes the stepping motor by repeating a pattern of rotating said stepping motor by outputting a first predetermined number of pulses followed by stopping the output of pulses for a period corresponding to a second predetermined number of pulses until a sum of the first predetermined number of pulses reaches a third predetermined number of pulses.

2. The device as defined in claim 1, wherein before starting said pattern, said initialization mechanism rotates said stepping motor continuously without any temporary stopping until it reaches a start position just before said movable member in the continuously variable transmission reaches said stopper.

3. The device as defined in claim 1, wherein said initialization mechanism increases the predetermined time interval of the pulse signal when said stepping motor begins to rotate and thereby slows the rotation speed of the stepping motor.

4. The device as defined in claim 1, wherein the initialization mechanism increases the predetermined time interval of the pulse signal just before stopping said stepping motor and thereby slows the rotation speed of the stepping motor.

5. The device as defined in claim 1, wherein said movable member is a member which determines the variable speed control position of the automatic transmission.

6. The device as defined in claim 2, wherein said start position is estimated based on data from previous positional determinations.

* * * * *